(12) United States Patent
Van De Meerendonk

(10) Patent No.: US 11,666,032 B2
(45) Date of Patent: Jun. 6, 2023

(54) MILKING SYSTEM

(71) Applicant: LELY PATENT N.V., Maassluis (NL)

(72) Inventor: Robertus Carolus Maria Van De Meerendonk, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 493 days.

(21) Appl. No.: 16/623,204

(22) PCT Filed: Jun. 14, 2018

(86) PCT No.: PCT/NL2018/050391
§ 371 (c)(1),
(2) Date: Dec. 16, 2019

(87) PCT Pub. No.: WO2019/004820
PCT Pub. Date: Jan. 3, 2019

(65) Prior Publication Data
US 2021/0137066 A1    May 13, 2021

(30) Foreign Application Priority Data

Jun. 27, 2017 (NL) ...................................... 2019130

(51) Int. Cl.
*A01J 5/01* (2006.01)
*A01J 5/04* (2006.01)
(Continued)

(52) U.S. Cl.
CPC .............. *A01J 5/0131* (2013.01); *A01J 5/01* (2013.01); *A01J 5/04* (2013.01); *A01J 9/04* (2013.01); *A01K 1/12* (2013.01)

(58) Field of Classification Search
CPC .... A01J 5/00; A01J 5/01; A01J 5/0131; A01J 5/04; A01J 9/04; A01J 5/048; A01J 5/007; A01K 1/12
See application file for complete search history.

(56) References Cited

U.S. PATENT DOCUMENTS 1,813,238 A * 7/1931 Cyrus ....................... A01J 5/04
                                                              119/14.06
2,037,467 A * 4/1936 Cyrus ....................... A01J 5/04
                                                              141/35
(Continued)

FOREIGN PATENT DOCUMENTS

EP          0 797 915 A2    10/1997
JP          2020-525023 A     8/2020
(Continued)

OTHER PUBLICATIONS

International Search Report dated Oct. 2, 2018 in PCT/NL2018/050391 filed on Jun. 14, 2018.
(Continued)

*Primary Examiner* — Joshua D Huson
*Assistant Examiner* — Megan J Moroney
(74) *Attorney, Agent, or Firm* — Oblon, McClelland, Maier & Neustadt, L.L.P.

(57) ABSTRACT

A milking system includes one or more milking devices and a control unit. The system is provided with a plurality of milking cups, a first milk jar for receiving the milking, a first pumping device for pumping the milking, a second milk jar for receiving the milking from the first milk jar, a second pumping device for pumping at least a part of the milking, and at least one storage tank for storing at least a part of the milking. The second pumping device pumps the milking at a lower flow rate than that at which the first pumping device pumps the milking. As a result, the milk is for the most part moved with low mechanical load and little admixture with air which improves milk quality. In the case of a plurality of milking devices in the milking system, various milkings can be moved and treated separately.

12 Claims, 1 Drawing Sheet

FIG. 1

(51) Int. Cl.
*A01J 9/04* (2006.01)
*A01K 1/12* (2006.01)
*A01J 5/013* (2006.01)

(56) References Cited

U.S. PATENT DOCUMENTS

| | | | | |
|---|---|---|---|---|
| 2,498,401 | A * | 2/1950 | Duncan | A01J 5/04 99/452 |
| 2,680,553 | A * | 6/1954 | Hein | A01J 5/04 141/35 |
| 3,387,677 | A * | 6/1968 | Norton | A01J 5/04 177/68 |
| 3,406,663 | A * | 10/1968 | Duncan | A01J 5/04 119/14.01 |
| 4,607,596 | A * | 8/1986 | Whittlestone | A61M 1/82 119/14.02 |
| 5,275,124 | A * | 1/1994 | van der Lely | A01J 7/022 119/14.08 |
| 6,197,538 | B1 * | 3/2001 | van den Berg | A01J 5/0131 422/50 |
| 7,600,484 | B2 * | 10/2009 | Claycomb | A01J 5/0134 119/14.02 |
| 2012/0298042 | A1 * | 11/2012 | Hofman | A01J 5/04 119/14.08 |
| 2017/0094936 | A1 | 4/2017 | Van Tilburg et al. | |

FOREIGN PATENT DOCUMENTS

| | | | |
|---|---|---|---|
| WO | WO 97/03394 A1 | 1/1997 | |
| WO | WO 97/16962 A1 | 5/1997 | |
| WO | WO 2007/073157 A1 | 6/2007 | |
| WO | WO 2008/127177 A1 | 10/2008 | |
| WO | WO-2010071413 A2 * | 6/2010 | A01J 5/007 |
| WO | WO 2012/113092 A1 | 8/2012 | |
| WO | WO 2015/170974 A1 | 11/2015 | |

OTHER PUBLICATIONS

Escobar, G.J., et al., "Effect of mechanical treatment on the free fatty acid content of raw milk", 1990, J.Dairy Sci., vol. 73, pp. 2054-2060.

"Robotic Milking", Proceedings of the International Symposium, Lelystad, NL, Aug. 17-19, 2000, pp. 19-31 with cover pages.

\* cited by examiner

MILKING SYSTEM

TITLE

BACKGROUND

The present invention relates to a milking system, comprising a milking device for milking a milking from a dairy animal during a milking operation and a control unit for the milking system, and provided with a plurality of milking cups, each ending in a milk hose, a first milk jar connected to the milk hoses which is configured to receive the milking, and provided with a first closable milk outflow, a first milk pipeline which is in flow communication with the first milk outflow, a first pumping device which is configured to pump the milking from the first milk jar into the first milk pipeline, and at least one storage tank for receiving and storing at least a part of the milking via the first milk pipeline.

Such milking devices are generally known per se, such as automatic milking devices in a conventional or robotic embodiment, such as the Lely Astronaut® and DeLaval VMS™ milking robots.

A drawback of the known milking devices is that, given their capacity, they are not always able to adequately guarantee the milk quality.

BRIEF SUMMARY

It is an object of the present invention to provide a milking system of the type mentioned in the introduction, which can offer improved milk quality.

The invention aims to achieve this object with a milking system as claimed in claim 1, in particular a milking system comprising a milking device for milking a milking from a dairy animal during a milking operation and a control unit for the milking system, and provided with a plurality of milking cups, each ending in a milk hose, a first milk jar connected to the milk hoses which is configured to receive the milking, and provided with a first closable milk outflow, a first milk pipeline which is in flow communication with the first milk outflow, a first pumping device which is configured to pump the milking from the first milk jar into the first milk pipeline, at least one storage tank for receiving and storing at least a part of the milking via the first milk pipeline, further comprising a second milk jar, which is attached in flow communication to the first milk pipeline for receiving the milking therefrom out of the first milk jar, and which is provided with a second milk outflow, a second milk pipeline, which is attached in flow communication to the second milk outflow and to the at least one storage tank, and a second pumping device which is configured to pump at least a part of the milking from the second milk jar into the second milk pipeline, wherein the second pumping device pumps the milking through the second milk pipeline at a lower flow rate than the first pumping device pumps said milking through the first milk pipeline.

In this case, the invention uses the insight that, on the one hand, the capacity of the milking system does not decline, because the pumping out of the first milk jar in principle occurs at the same speed as in the known milking systems and the milking system thus becomes free again at the same speed, but that, on the other hand, the milk only has to be pumped at the associated higher speed, or at least the higher flow rate, up to the second milk jar. High speeds are disadvantageous to the quality of the milk, in particular the fat globules therein. Especially in larger milking systems, the milk tank for (cold) storage of the milk is often located a considerable distance away. If the milk is pumped at high speed over such a distance, it is possible that many of the fat globules will be damaged and many free fatty acids are formed, which is disadvantageous to the milk quality. According to the invention, the milk of the milking is pumped from the first to the second milk jar at a normal speed/flow rate, and then pumped further at a lower speed/flow rate. Alternatively, one can say that the pumping-out time of the first milk jar is shorter than the pumping-out time of the second milk jar. The first pumping-out time is in principle as short as possible, or at least sufficiently short in order for the milk jar to be available again for the next milking operation. It is desirable to use no more than approximately 1 minute for this, since within this time the next dairy animal can enter the milking device and be prepared for its milking, with cleaning, stimulation, and connection of the milking cups. The pumping speed may, for example, be from 10 to as much as 25 liters/minute. By contrast, the pumping-out time of the second milk jar may be as long as an average milking operation, such as 6 to 9 minutes, for example. The pumping speed can therefore drop to 1.5-2 liters/minute, for example, which guarantees a much milder treatment of the milk. Not only does the milk quality remain high due to the fact that fewer fat globules are damaged, but the milk is also admixed with air to a lesser degree due to the lower flow velocity.

It should be noted that, in the invention, the path length to be covered at a normal, and thus higher, speed is smaller than in the known milking systems. Such a distance may, for example, remain limited to one meter or even less. It should be noted that it is not a problem to choose a larger than normal cross section for the (first) milk pipeline which connects the first and the second milk jar. This reduces the speed of the milk even further, while the fact that the milk cannot always fill the whole pipeline does not cause much of a nuisance, since that is not relevant for the short movement. A cross-sectional area of the first milk pipeline is therefore advantageously greater than, more advantageously at least twice as large as, a cross-sectional area of the second milk pipeline.

It should also be noted that the milking can be pumped, for example, to the milk tank in order to be stored there, as consumption milk. It is also possible to alternatively discharge milk not suitable for consumption to a drain, for example, or to one or more additional storage containers, such as colostrum or calf milk. It is also not necessary to pump the entire milking from the first to the second milking glass, or from there to the same destination. All of this will be explained in more detail below.

Advantageous but non-limiting embodiments are described in the dependent claims, and in the following description.

In embodiments, the first and the second milk jar have substantially the same volume. This ensures that the second milk jar can always process the entire contents of the first milk jar. On the other hand, this also limits the volume of the second milk jar to that which is necessary, as a result of which the quantity of material for the second milk jar and the volume which this occupies remains limited as far as possible. In particular, the first and the second milk jar each have a volume, which is substantially equal to a maximum expected milking. This ensures that the first milk jar, and thus the second milk jar, can in principle never be overfilled. If a dairy animal produces an unexpectedly large milking, for example after a very long milking interval, or in the case of a new dairy animal of a different breed or the like, it is also possible to pump the first milk jar to the second milk jar before the milking is fully complete.

In this respect, "substantially the same volume" or "volume substantially equal to" is understood to mean that the volumes differ by less than 50%, advantageously less than 20%. It is emphasized here that the second milk jar is not the same as a buffer tank, which is known per se. Such a buffer tank is intended in order for the milking device to be able to continue milking if the bulk milk tank is emptied or cleaned, for example, and the milk therefore cannot be discharged to said bulk tank. The buffer tank in that case serves to store the milk of a plurality of milkings, and from there ultimately to discharge it to the bulk milk tank. In that case, said discharging in turn usually occurs in principle at the same or a similar speed to that at which milk is discharged from the first milk jar.

In embodiments, the milking device comprises a milking station with a milking robot visitable voluntarily by the dairy animal. Although the invention is certainly also suitable to be combined with a conventional milking device or a milking robot with forced and thus regular cow traffic, the embodiment with a voluntarily visitable milking robot offers further advantages. Precisely because of the voluntary cow traffic, there may, for example, be some time between visits by dairy animals. In such a case, it is advantageous to further adjust, in particular reduce, the pumping time. The control unit may reduce the pump speed of the first and/or of the second pump device, or extend the respective pumping time, on the basis of an expected time until the next visit determined from historical data. Alternatively, the control unit may, for example, carry out the pumping of at least a part of the milk of the milking at a lower pump speed, as long as the control unit has not yet detected the next dairy animal using an animal detection and/or identification system provided for this purpose. Other measures for a lower milk speed are known per se. All such measures may lead to further improved milk quality. And the possibility for such quality-improving measures exists in particular in robotic milking with voluntary cow traffic, in contrast to milking systems with forced cow traffic, where a milking following directly afterwards is already determined, and there is thus no margin for reducing the speeds.

In embodiments, the milking system comprises at least two of said milking devices, in particular milking robots, and these are each provided with a respective first milk jar with first pumping device and respective second milk jar with second pumping device connected thereto, and a pipeline system, via which pipeline system each of the second milk jars is connectable to the at least one milk tank, wherein the control unit is configured to control the respective pumping devices in order to pump each respective milking separately via the pipeline system to the at least one milk tank.

In relatively large farms, there are often a plurality of milking devices provided in the milking system. For example, a single milking robot is suitable for 60 to 80 dairy cows, so that larger farms will comprise a corresponding number of milking robots. The associated pipeline system may in principle comprise completely separate connections of each of the milking devices to the one or more milk tanks. In that case, the control of these is in principle very straightforward, and may simply take place in parallel. It is also possible to attach the plurality of milking devices, or at least two or more thereof, to a single milk pipeline via their respective second milk jar. The control unit of the milking system, or if desired the respective control units of the milking devices, may then be configured to pump the respective milkings separately to the desired destination, such as the or a milk tank. In this case, one or more valves controllable by the control unit(s) will also be provided in the pipeline system. To this end, it is sufficient if each milking is pumped into the milk pipeline as an uninterrupted whole, so that it is transported to the destination as a "milk plug", and there is little risk of the successive milkings mixing. This may be important in order to perform one or more operations on the basis of the respective milk properties, such as selecting a destination for the milking.

It has already been stated above that the milk of the milking can be pumped to a milk tank. In such a milk tank, the milk can be kept cool until it is collected by a milk tanker, for example, or is otherwise further processed. It is also possible that the milk of a milking, or at least a part thereof, is not stored but is discharged to a drain or other discharge, for example because the milk contains antibiotics. It is also possible to indeed store the milk, but in a second tank. The second tank then contains, for example, milk that is usable but not suitable for human consumption, such as colostrum. It is also possible that the milk of the milking, on the basis for example of its quality, is stored in one of two or more consumption milk tanks. In embodiments, the milking system therefore comprises a plurality of milk tanks connectable to the or each second milk jar.

It should be noted here that such an embodiment may entail significant effects. On the one hand, this ensures that the various milkings can remain separated from one another even in relatively large farms with a plurality of milking devices. Milk from various dairy animals may have different properties. In order to ensure the optimum use of this milk having these properties, it is important to keep this milk (these milkings) separate. If two or more milking devices were to finish milking at the same time, and would thus want to empty their respective milk jars into the same milk pipeline at the same time, one will need to wait for the other in order to prevent mixing. In some cases, this may be to the detriment of the capacity. In the present invention, this is offset by the fact that the control unit merely has to ensure that both second milk jars are pumped out during a subsequent milking. This is because, in this case, both first milk jars may be pumped out directly and at the same time without the risk of milk mixing. There is then a time span available for pumping out both second milk jars. Although it will then be necessary to select a higher pump speed, in other words a shorter pumping-out time, the slightly higher speed, which is still lower than normal, does not outweigh the advantages of careful milk treatment and being able to keep the (consumption) milkings separate.

In embodiments, the milking system further comprises a milk treatment device in flow communication with the second milk pipeline and/or at least one of the one or a plurality of milk tanks, for receiving and treating the milk of the milking, in particular bringing said milk to a desired temperature or composition. The invention uses the insight of using the second milk jar to enable a very mild treatment of milk, and achieves this in part by being able to pump the milk from the second milk jar at a much lower speed. This also means that although the milk flow has a lower peak size, it is much more regular. This may be advantageous if the milk is subsequently treated in the linked milk treatment device. Many such milk treatment devices benefit from a more regular milk flow of this kind, for example because their maximum capacity can be selected to be smaller and/or because they are also usually then able to treat the milk in a more careful manner.

As described above, the invention is also highly suitable for also being able to keep various milkings separate. The milkings in question may contain milk of different properties, which may also need to be treated differently. For example, the milk from some dairy animals is highly suited for cheese owing to a very low somatic cell and/or plate count, or it derives from a genetically different or modified dairy animal whose milk contains a particular substance.

In embodiments, the or each milking device comprises at least one of an animal identification device operatively connected to the control unit for identifying the dairy animal and having an animal database containing information on at least a quantity and/or the composition of the milk of the dairy animal, and a milk sensor device operatively connected to the control unit for determining information on a quantity and/or the milk composition of the obtained milk, wherein the control unit is configured to control the respective pumping devices and/or the pipeline system on the basis of said information. Using said information, the control unit may, for example, control the pipeline system, such as the valves thereof, in such a way that milk having known properties goes to an associated destination or is otherwise treated in a manner associated with this milk. The information may in this case be based on the animal identity. The animal identity may, in the control unit or a device operatively connected thereto, be linked to the information which may comprise, for example, that the milk contains a certain unique substance, has a certain (low) plate and/or somatic cell count, or indeed that the animal has been treated with antibiotics, has just calved, or has a disease such as mastitis, etc. Such information is in principle historical information, which may either have been entered by the farmer or operator, or based on earlier measurements of the milk or the animal, etc., and this information will generally not or only gradually vary. Said information may also or partly derive from the milk sensor device, which in that case provides information regarding the milk to the control unit, advantageously in real time. Such information may vary from milking operation to milking operation, or even during a milking operation, and may be of many different types, with, in particular, information regarding the composition. The composition information may be relative, such as an indication of whether a certain substance is present in the milk, including an antibiotic, blood, an increased somatic cell count or a particular substance in a genetically different animal. The composition information may alternatively or additionally comprise absolute information, such as contents of one or more substances, including milk fat, milk protein, lactose, somatic cell count, etc.

Using such information, it is, for example, possible to keep milk of different types separate and treat it carefully without or with only little loss of capacity for the milking system as a whole.

For example, in embodiments, the milking system further comprises a heat exchanger system provided in a desired milk flow direction downstream of the or each second pumping device, which is configured to bring the milk of the milking to a desired temperature, wherein at least one of the or each second pumping device and the heat exchanger device is controllable by the control unit on the basis of the information. In this case, the heat exchanger device may serve to cool the milk, for example to a temperature of at most 4° C. for storage, but also to a different temperature, such as a temperature suitable for making yogurt or cheese from the milk. In particular embodiments, a plurality of heat exchanger devices are provided, at least two of which each bring the milk to a different temperature. Advantageously, a pipeline system is then provided, having a valve device actuable by the control unit, wherein the control unit controls the valve device on the basis of said information for directing the milk towards a desired heat exchanger device of the heat exchanger devices. It is thus possible for milk suitable for cheese, for example having a very low plate count, to be directed to another destination and already preprocessed, unlike other milk such as milk for direct human consumption.

Advantageously, the control device is configured to operate the or each second pumping device in such a way that a resulting net total milk flow from the second pumping device(s) to said heat exchanger device shows as little variation as possible. For example, each second pumping device is actuated in such a way that the pump speed has substantially a constant value, which is based, for example, on a historical average total production, including as a function of the time of day. This is because dairy animals in principle have an intrinsic milk production which remains roughly the same for hours (up to as many as 10-15 hours) after a milking. Therefore, a total daily production will likewise usually scarcely change. In this way, it can reasonably be predicted what a pumping speed needs to be to pump all of the milk as uniformly as possible through the heat exchanger device, in order to thus obtain effective control over the heat exchange and to be less dependent on the capacity of the milking device, in particular the actual milk flow currently being milked. There may of course be variation in the visiting frequency of the dairy animals to the milking device(s). For instance, it is much quieter during the night than at a number of moments during the day. The control unit may take this into account, for example, by also varying the pumping speed in accordance with such a pattern and/or maintaining a pump speed which is set to the maximum production during the day. However, other settings are possible. In all such ways, the control unit of the milking system may help to keep the net capacity of the heat exchanger system as low as possible. Not only is the milk to be cooled or heated supplied as gradually as possible, but it is also advantageous if the control unit can also actuate the heat exchanger device on the basis of the information. For example, the capacity can be adapted to the received quantity of milk, which is already determined during the milking, and at the latest on being pumped out of the first milk jar. Actuating the heat exchanger device is not only advantageous as regards energy, since it is possible to prevent an excessively low capacity or an overcapacity in an efficient way, but may also prevent the milk from being cooled or heated too much, thus freezing or burning. A significant advantage of the milking system according to the present invention is that further devices in the system which receive milk may be controlled by the control unit on the basis of said information, which comprises information on a quantity or composition, and preferably both. The control unit may thus set the further devices for the desired operation, in particular on the basis of the composition, and also the amount of milk to which the treatment applies, and as already stated above this treatment can take place relatively calmly, since the actuation by the second milk jar is not caused by the milking device(s) becoming clear.

BRIEF DESCRIPTION OF THE DRAWINGS

The invention will now be explained in more detail with reference to the drawing, which shows a non-limiting embodiment, and in which.

DETAILED DESCRIPTION

Figure 1:
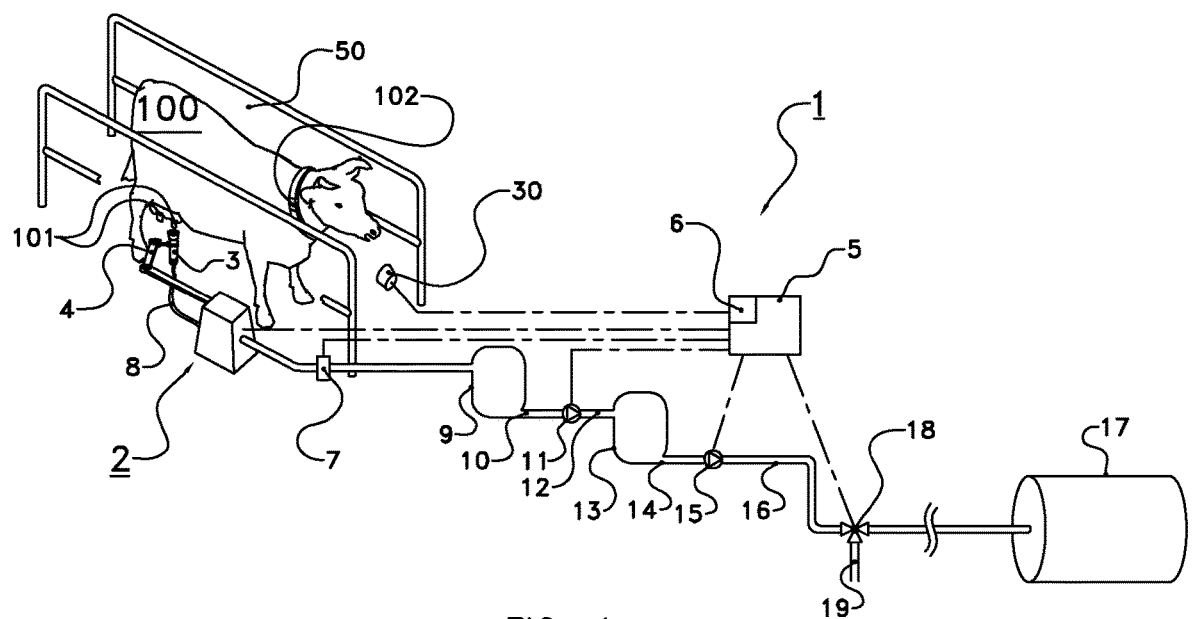
FIG. 1 shows a diagrammatic view of a first milking system according to the invention.

FIG. 1 shows a diagrammatic view of a first milking system 1 according to the invention. The system 1 comprises an automatic robot milking device 2, milking cups 3, a robot arm 4 and a control unit 5, with a database 6, and also a milk sensor 7, a milk hose 8, a first milk jar 9 having a first milk outflow 10, a first milk pump 11, a second milk hose 12, a second milk jar 13 having a second milk outflow 14, a second milk pump 15, a milk pipeline 16, and a milk tank 17. Reference numeral 18 is used to denote a three-way valve with a discharge to a drain 19.

Also shown is a milking station 50 with a dairy animal 100 with teats 101 and an ID tag 102, and an animal identification device 30.

The robot milking device 2 comprises a robot arm 4 for attaching milking cups 3, only one of which is shown here, to the teats 101 of a dairy animal 100. In this case, the robot arm is provided with a gripper for gripping and attaching milking cups 3 one by one, but this may also be an arm which is provided with a holder with the four milking cups arranged removably thereon. However, such details are not important here. For control purposes, the robot milking device is provided with or connected to a control unit 5, having a database 6 containing data on the dairy animals and/or with space for storing data on the dairy animals, such as milk data. In order to correctly combine data in the database 6, an animal identification device 30 is provided, such as a tag reader, for reading an ID tag 102 around the neck of the dairy animal 100. The dairy animal 100 may in this case present itself voluntarily to the milking station 50, or also as a result of forced cow traffic, wherein a herd is driven to a milking station twice a day, for example.

The robot milking device 2, 4 may also be replaced with a conventional milking device, in which the milking cups 3 are attached manually by milkers. This does not matter to the invention, although the advantages will be more noticeable in the case of irregular, voluntary visits by the animals, such as in a robot with free cow traffic.

When milking the dairy animal 100, the milk obtained will be received as a milking in the first milk jar 9 via the milk hose 8. Partly on the basis of data associated with the dairy animal 100 from the database 6 and/or data obtained by the milk sensor 7 during milking, it is possible to determine a milk quality and partly on this basis also the destination of the milk. Milk which meets the requirements is, for example, directed by the control unit 5 to the bulk tank 17 for consumption milk, while unsuitable milk, such as milk from sick dairy animals, can be sent to another destination such as a drain 19, when the control unit 5 actuates the three-way valve 18 accordingly. It is of course possible to provide a plurality of destinations, with a valve device adapted accordingly.

In order to clear the milking device 2, 4 again as quickly as possible for a subsequent milking, the milk in the first milk jar 9 is pumped away via the first milk outflow 10 with the aid of the first milk pump 11. The available time is in principle no more than the time which is needed for the dairy animal 100 to leave the milking station 50, and to allow a subsequent dairy animal to enter the station and prepare for the milking. This time is in the order of magnitude of 1 minute. In the known milking systems, this milk would therefore be pumped at a correspondingly high speed through the entire milk pipeline system to the milk tank. At such high speeds, however, the milk is subjected to mechanical stress and intimately mixed with air. This is unfavorable in terms of the milk quality, in particular that of the fat globules, as it results in the release of a relatively large number of free fatty acids, which makes the milk rancid. In the present invention, by contrast, the milk of the milking is pumped out of the first milk jar 9 just as fast, but only over a short distance, specifically only through the second milk hose 12 to the second milk jar 13. Not only is this distance much shorter than an average distance to the bulk tank in a conventional milking system, the latter distance easily being tens of meters, but the second milk hose 12 can also be optimized for fast transport over a short distance. For example, the second milk hose may have a large diameter, and also little flow resistance otherwise.

Any admixed air may then escape again in the second milk jar 13. However, it is more important that the milk may then be pumped further to the milk tank 17 via the second milk outflow 14 and the milk pipeline 16 much more calmly with the aid of the second milk pump 15. This is because the time for this pumping is, for example, approximately the same as the time from receiving the milk from the first milk jar to the end of the following milking. This time is in principle at least equal to the duration of a milking, around 6 to 10 minutes, but if a subsequent dairy animal does not present itself immediately this time may be virtually unlimited. The pumping speed of the milk through the second milk pump 15 can therefore be selected to be much lower, which benefits the milk quality. Moreover, the control unit 5 may be configured to dynamically control this pumping speed, for example on the basis of the expected waiting time. The expected waiting time may in turn be determined by the control unit using the point in time at which a subsequent dairy animal is identified, and/or when a milking of the subsequent dairy animal begins, and/or the expected milk yield of the subsequent dairy animal and based on this the expected milking duration, etc.

It should be noted that it is advantageous to provide the three-way valve 18 between the first milk jar 9 and the second milk jar 13. After all, it does not make sense to deal carefully with milk which will not subsequently go to the consumption milk tank 17.

Figure 2:
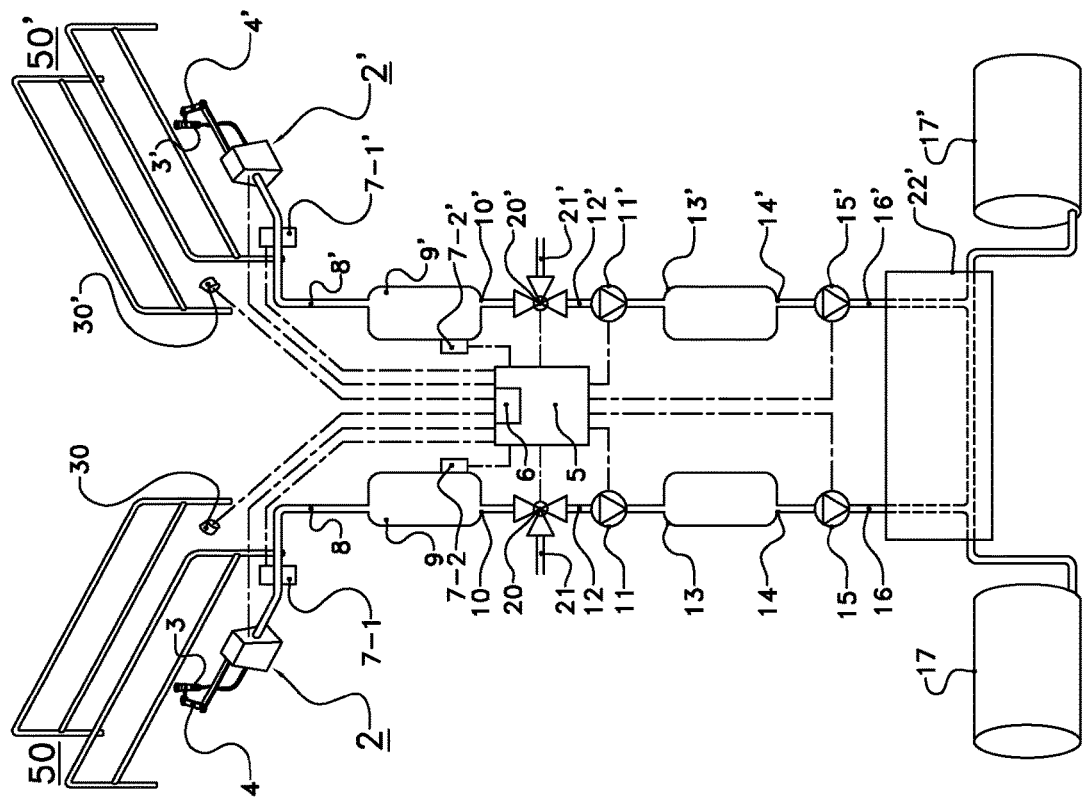
FIG. 2 shows a diagrammatic view of another milking system according to the invention.

FIG. 2 shows a diagrammatic view of another milking system according to the invention.

Here, the milking system comprises two milking devices 2 and 2' and a control unit 5 with database 6. In this case, similar parts in the whole of the figure are indicated using the same reference numerals, where required provided with one or more prime symbols. The milking devices operate respective milking stations 50 and 50' having tag readers 30 and 30', and each comprise milking cups 3, 3', an operable robot arm 4, 4', sensors 7-1 and 7-2 and 7-1' and 7-2', respectively, a milk hose 8, 8', a first milk jar 9, 9', a first milk outlet 10, 10', a first milk pump 11, 11', a second milk hose 12, 12', a second milk jar 13, 13', a second milk outlet 14, 14', a second milk pump 15, 15', and a milk pipeline 16, 16', and a three-way valve 20, 20' having a discharge pipeline 21, 21'.

The milking system further comprises a valve device 22 and two milk tanks 17, 17'.

When a dairy animal presents itself at the milking station 50 for milking while milking station 50' is and remains empty during the milking, the operation of the milking system from FIG. 2 largely corresponds to that of the milking system of FIG. 1. The milk from the milking is received in the first milk jar 9 as a milking. On the basis of data from the database 6 which are associated with the identified dairy animal, and/or on the basis of data as determined in the milk by sensors 7-1 and/or 7-2, the control unit 5 decides whether the milking must be discharged to the discharge pipeline 21 by turning the three-way valve 20 or to one of the milk tanks 17 or 17' if it is suitable consumption milk. On the basis of the animal identity and data in the database 6 and/or the values measured by the sensors 7-1 and 7-2, the control unit 5 can determine in which tank 17 or 17' the milk needs to be stored. For example, the herd of dairy animals comprises one or more dairy animals with particular milk, such as genetically different milk, A2 milk, etc. It is also possible to store milk from animals having a lower than average fat or protein content in one tank 17 and from animals having a higher than average fat or protein content in the other tank 17'. It is even possible to store a first part of the milk from a milking in the first tank 17 and a second part of the milk in the second tank 17'. As a result, the second part of the milk from each milking, which is richer in fat, can be collected. The milk thus obtained contains more fat (cream) and can thus be processed as a more expensive product which is richer in fat. On the other hand, the milk in tank 17, which is lower in fat, may, for example, be used for skim and/or semi skim milk, since less fat needs to be removed from it.

In all these cases, the control unit 5 controls the necessary parts, in particular the first and second milk pump 11 and 15, and the three-way valve 20 and the valve device 22. The valve device is only illustrated diagrammatically here, but comprises one or more valves and pipelines to the milk tanks 17 and 17' provided.

Optional milk processing parts, such as coolers/heat exchangers, pasteurizing devices and others, are not shown here. These may be provided, viewed in the flow direction of the milk, downstream of the valve device 22, and then upstream or downstream of the tank 17 or 17'. A significant advantage of using such milk processing parts, when placed upstream of the tank 17 or 17', is that the milk can be supplied to the processing device in as constant a stream as possible, and at a low flow rate. As a result, its capacity may also be selected to be relatively low. This applies, for example, to coolers, pasteurizing devices, etc.

The above description applied in particular to the case in which a dairy animal which was milked was only present at milking station 50. In the event that a dairy animal was or is present at milking station 50' during the milking of the dairy animal at milking station 50, it may be the case that the pumping away of the milking from milking station 50 and the pumping away of the milking from milking station 50' can influence one another. In the prior art, in order to cause no or as little capacity loss as possible in the milking devices, both milkings would be pumped away at the same time out of the respective first and in that case only milk jar, and thus reach a milk pipeline at the same time. Both milkings would thus inevitably mix. In the present embodiment according to the invention, by contrast, both milkings can still be pumped away out of the respective first milk jars 9 and 9' even at the same time. In that case, however, they are collected in the respective second milk jars 13 and 13'. From there, the control unit 5 can pump each milking separately to the desired milk tank 17 or 17', with it being possible for the other milking to wait for its turn. The time for pumping the milking is still longer here than in a conventional milking system. In general, it thus covers less distance at a high speed/high flow rate than in a conventional milking system. In practice, it will not often be the case that two milkings are ready to be pumped at exactly the same time. Much more often, after a milking has ended, the next milking will only become available some time later. The control unit 5 can in this case easily begin to pump the first milking, and when or if a second milking is ready to be pumped, the control unit can increase the pumping speed if necessary in order to have sufficient time for pumping the second milking.

An important observation is that the control unit can in each case guarantee that the milkings remain separate. This also means that milkings having different properties can also continue to be treated differently. No mixing needs to occur, so that it is possible to guarantee the optimum quality of the milk even per milking. It is therefore not necessary to keep dairy animals having particular properties individually or in small groups. Not only is that unfavorable to the animal welfare of most dairy animals, which are usually herd animals, but it also limits the efforts and costs in the field of housing and other animal management.

In an alternative embodiment of the milking system according to FIG. 2, a controllable connection, for example with a three-way valve and a pipeline, is provided between the first milk pump 11 and both second milk jars 13 and 13'. Further optionally, a comparable connection is provided from the first milk jar 9' to both second milk jars 13 and 13'. The control unit 5 may thus, for example, already supply two or more parts of a milking separately to the rest of the milking system during a milking.

It should also be noted here that, in general, it is also possible to provide more than two milking devices 2, 3. It is also possible to provide more than two second milk jars 13. It is also possible to provide more than two milk tanks 17. The relevant pipelines and control valves are of course provided, where appropriate. The control unit can thus distinguish between a plurality of types of milk, including in one milking. The number of second milk jars 13 per milking system may, for example, be equal to the number of milk tanks 17, wherein the respective first milk jar 9 of each milking device 2, 3 is connectable by the control unit to each of the second milk jars. The control unit once again determines the selection of the second milk jar on the basis of animal data and/or sensor data of the milk of the dairy animal. It is also possible to provide a second milk jar per milking device 2, 3, with all second milk jars 13 being connectable to each of the plurality of milk tanks 17 via a valve device similar to device 22 in FIG. 2.

The embodiments described and illustrated are merely intended in a non-limiting way to explain the invention. The scope of protection is described in the attached claims.

The invention claimed is:

1. A milking system, comprising:
   a milking device for milking a milking from a dairy animal during a milking operation,
   a control unit for the milking system,
   a plurality of milking cups, each ending in a milk hose,
   a first milk jar connected to the milk hoses which is configured to receive the milking, and provided with a first closable milk outflow,
   a first milk pipeline which is in flow communication with the first milk outflow,
   a first pumping device which is configured to pump the milking from the first milk jar into the first milk pipeline,
   at least one storage tank for receiving and storing at least a part of the milking via the first milk pipeline,
   a second milk jar which is attached in flow communication to the first milk pipeline for receiving the milking therefrom out of the first milk jar, and which is provided with a second milk outflow, a second milk pipeline, which is attached in flow communication to the second milk outflow and to the at least one storage tank, and a second pumping device which is configured to pump at least a part of the milking from the second milk jar into the second milk pipeline, wherein the second pumping device pumps the milking through the second milk pipeline at a lower flow rate than the first pumping device pumps said milking through the first milk pipeline.

2. The milking system as claimed in claim 1, wherein the first and the second milk jar have substantially a same volume.

3. The milking system as claimed in claim 2, wherein the same volume is equivalent to a maximum expected milking.

4. The milking system as claimed in claim 1, wherein the milking device comprises a milking station with a milking robot visitable voluntarily by the dairy animal.

5. The milking system as claimed in claim 1, comprising at least two of said milking devices, and each provided with a respective first milk jar with first pumping device and respective second milk jar with second pumping device connected thereto, and a pipeline system, via which pipeline system each of the second milk jars is connectable to the at least one milk tank, wherein the control unit is configured to control the respective pumping devices in order to pump each respective milking separately via the pipeline system to the at least one milk tank.

6. The milking system as claimed in claim 5, wherein said milking devices, are milking robots.

7. The milking system as claimed in claim 1, comprising a plurality of milk tanks connectable to the second milk jar.

8. The milking system as claimed in claim 1, further comprising a milk treatment device in flow communication with the second milk pipeline and/or at least one of the one or a plurality of milk tanks, for receiving and treating the milk of the milking.

9. The milking system as claimed in claim 8, wherein treating the milk of the milking comprises bringing said milk to a desired temperature or composition.

10. The milking system as claimed in claim 1, wherein the milking device comprises at least one of:

an animal identification device operatively connected to the control unit for identifying the dairy animal and having an animal database containing information on at least a quantity and/or the composition of the milk of the dairy animal, and a milk sensor device operatively connected to the control unit for determining information on a quantity and/or the milk composition of the obtained milk, wherein the control unit is configured to control the respective pumping devices and/or the pipeline system on a basis of said information.

11. The milking system as claimed in claim 1, further comprising a heat exchanger system provided in a desired milk flow direction downstream of the second pumping device, which is configured to bring the milk of the milking to a desired temperature, wherein at least one of the second pumping device and the heat exchanger device is controllable by the control unit on a basis of the information.

12. A milking system, comprising:

a milking device for milking a milking from a dairy animal during a milking operation, a control unit for the milking system, a plurality of milking cups, each ending in a milk hose, a first milk jar connected to the milk hoses which is configured to receive the milking, and provided with a first closable milk outflow, a first milk pipeline which is in flow communication with the first milk outflow, a first pumping device which is configured to pump the milking from the first milk jar into the first milk pipeline, at least one storage tank for receiving and storing at least a part of the milking via the first milk pipeline, a second milk jar which is attached in flow communication to the first milk pipeline for receiving the milking therefrom out of the first milk jar, and which is provided with a second milk outflow, a second milk pipeline, which is attached in flow communication to the second milk outflow and to the at least one storage tank, and a second pumping device which is configured to pump at least a part of the milking from the second milk jar into the second milk pipeline, wherein the second pumping device is configured to pump the milking through the second milk pipeline at a lower flow rate than the first pumping device pumps said milking through the first milk pipeline, at least two of said milking devices, and each provided with a respective first milk jar with first pumping device and respective second milk jar with second pumping device connected thereto, and a pipeline system, via which pipeline system each of the second milk jars is connectable to the at least one milk tank, wherein the control unit is configured to control the respective pumping devices in order to pump each respective milking separately via the pipeline system to the at least one milk tank, and a plurality of milk tanks connectable to the second milk jar.

* * * * *